US008725741B2

(12) United States Patent
Cohen et al.

(10) Patent No.: US 8,725,741 B2
(45) Date of Patent: May 13, 2014

(54) ASSESSING APPLICATION PERFORMANCE WITH AN OPERATIONAL INDEX

(75) Inventors: Alain J. Cohen, McLean, VA (US); Yiping Ding, Dover, MA (US)

(73) Assignee: Riverbed Technology, Inc., San Francisco, CA (US)

(*) Notice: Subject to any disclaimer, the term of this patent is extended or adjusted under 35 U.S.C. 154(b) by 33 days.

(21) Appl. No.: 13/444,583

(22) Filed: Apr. 11, 2012

(65) Prior Publication Data

US 2013/0036122 A1    Feb. 7, 2013

Related U.S. Application Data

(60) Provisional application No. 61/474,488, filed on Apr. 12, 2011.

(51) Int. Cl.
*G06F 17/30* (2006.01)
(52) U.S. Cl.
USPC .......................................... 707/748; 714/47.1
(58) Field of Classification Search
None
See application file for complete search history.

(56) References Cited

U.S. PATENT DOCUMENTS

| | | | |
|---|---|---|---|
| 5,375,199 A | 12/1994 | Harrow et al. | |
| 6,061,724 A | 5/2000 | Ries et al. | |
| 6,313,768 B1 | 11/2001 | Allen | |
| 6,449,739 B1 | 9/2002 | Landan | |
| 6,529,954 B1 | 3/2003 | Cookmeyer et al. | |
| 6,781,959 B1 | 8/2004 | Garakani et al. | |
| 6,801,940 B1 * | 10/2004 | Moran et al. | 709/224 |
| 6,871,227 B2 | 3/2005 | Allen | |
| 6,959,265 B1 | 10/2005 | Candela et al. | |
| 6,975,330 B1 | 12/2005 | Charlton et al. | |
| 7,010,593 B2 | 3/2006 | Raymond | |
| 7,197,559 B2 | 3/2007 | Goldstein et al. | |
| 7,218,928 B2 | 5/2007 | Park et al. | |
| 7,290,048 B1 | 10/2007 | Barnett et al. | |
| 7,293,287 B2 | 11/2007 | Fischman et al. | |
| 7,392,234 B2 | 6/2008 | Shaath et al. | |
| 7,467,202 B2 | 12/2008 | Savchuk | |
| 7,509,229 B1 | 3/2009 | Wen | |
| 7,546,368 B2 | 6/2009 | Drees et al. | |
| 7,577,689 B1 | 8/2009 | Masinter et al. | |
| 7,593,351 B1 | 9/2009 | Zioulas et al. | |
| 7,606,165 B2 | 10/2009 | Qiu et al. | |

(Continued)

OTHER PUBLICATIONS

International Search Report and Written Opinion mailed on Jan. 14, 2013 in corresponding International Application No. PCT/US2012/033102.

*Primary Examiner* — Uyen Le
(74) *Attorney, Agent, or Firm* — Sterne, Kessler, Goldstein & Fox P.L.L.C.

(57) ABSTRACT

The present invention relates to a system and method for assessing application performance and user satisfaction. In one embodiment, the system and method calculates an Operational Index (OPdex) representing user satisfaction with an application. The OPdex may be a number quantifying user satisfaction with an application, such as a web application, and system performance. The OPdex may be based on one or more measurable metrics having a range of values that may affect user satisfaction or performance of an application. The OPdex may comprise calculating the index based on a soft threshold, a hard threshold, and measurements indicating a perceived application response time. The OPdex calculation may also account for sensitivity of user satisfaction to response time. Based on the OPdex, the system and methods also provide information indicating the relationship among application response time thresholds set by the users, the user satisfaction level, and the mean response time.

25 Claims, 18 Drawing Sheets

(56) References Cited

U.S. PATENT DOCUMENTS

| | | |
|---|---|---|
| 7,730,172 B1 | 6/2010 | Lewis |
| 7,891,000 B1 | 2/2011 | Rangamani et al. |
| 7,925,729 B2 | 4/2011 | Bush et al. |
| 7,954,144 B1 | 5/2011 | Ebrahimi et al. |
| 7,979,522 B2 | 7/2011 | Lunsford |
| 7,984,126 B2 | 7/2011 | McBride |
| 2002/0078195 A1 | 6/2002 | Allen |
| 2002/0124070 A1 | 9/2002 | Pulsipher |
| 2002/0133799 A1* | 9/2002 | Alpert et al. .............. 716/13 |
| 2002/0198985 A1 | 12/2002 | Fraenkel et al. |
| 2003/0065986 A1 | 4/2003 | Fraenkel et al. |
| 2003/0131098 A1 | 7/2003 | Huntington et al. |
| 2003/0135612 A1 | 7/2003 | Huntington et al. |
| 2003/0204789 A1 | 10/2003 | Peebles et al. |
| 2004/0049693 A1 | 3/2004 | Douglas |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2005/0064820 A1 | 3/2005 | Park et al. |
| 2005/0102402 A1 | 5/2005 | Whitehead |
| 2005/0108379 A1 | 5/2005 | Gray et al. |
| 2005/0195797 A1 | 9/2005 | Kryuchkov et al. |
| 2006/0190480 A1 | 8/2006 | Ori et al. |
| 2006/0190488 A1 | 8/2006 | Cohen et al. |
| 2006/0274684 A1 | 12/2006 | Diener |
| 2007/0079243 A1* | 4/2007 | Leigh et al. .............. 715/736 |
| 2007/0220489 A1 | 9/2007 | Kashiwagi |
| 2008/0263112 A1 | 10/2008 | Shaath et al. |
| 2009/0204704 A1 | 8/2009 | Muret et al. |
| 2011/0167145 A1 | 7/2011 | Bush et al. |
| 2011/0213869 A1 | 9/2011 | Korunsky et al. |

\* cited by examiner

ASSESSING APPLICATION PERFORMANCE WITH AN OPERATIONAL INDEX

CROSS-REFERENCE TO RELATED APPLICATIONS

This application claims the benefit of U.S. Provisional Patent Application 61/474,488, entitled "Assessing Application Performance with an Operational Index," filed Apr. 12, 2011, which is expressly incorporated by reference herein in its entirety.

FIELD

The embodiments relate to application performance monitoring and management.

BACKGROUND

Application performance management relates to technologies and systems for monitoring and managing the performance of applications. For example, application performance management is commonly used to monitor and manage transactions performed by an application running on a server to a client.

With the advent of new technologies, the complexity of an enterprise information technology (IT) environment has been increasing. Frequent hardware and software upgrades and changes in service demands add additional uncertainty to business application performance. However, effectively gauging user satisfaction for business software applications and clearly communicating the system and application performance results between business application users and IT professionals is a challenging task.

Unfortunately, typical application performance measurement data rarely provides a clear and simple picture of how well applications are performing. Reporting several different kinds of data, such as application response time, often fails to clarify how an application is performing. Accordingly, it would be desirable to provide an improved way to assess the performance of an application.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

The embodiments provide a way for assessing application performance and user satisfaction. In one embodiment, application performance is scored with an Operational Index (hereinafter "OPdex"). An OPdex is an index that quantifies user satisfaction for a range of one or more application performance metrics. The OPdex provides a way to quantify subjective user satisfaction between complete satisfaction and dissatisfaction.

In one embodiment, the user satisfaction is quantified on a scale, such as 0 to 1, 0 to 100, etc. To assist human and machine interaction, the OPdex may also be mapped to a color code, such as between red and green or vise versa, continuously on its scale.

The OPdex gauges ranges of application performance metrics using what can be referred as a hard threshold, Z, and a soft threshold, T. The hard threshold, Z, is a threshold above which values of the application metric result in unsatisfactory OPdex scores. The soft threshold, T, is a threshold above which values of the application metric result in declining OPdex scores from satisfactory.

The embodiments can examine the factors that affect the selection of a hard threshold Z from a system capacity planning perspective. In addition, after achieving a performance goal, the OPdex may indicate how further improvement may require substantial commitment in terms of resources, which is not proportional to OPdex scores. The analytical model helps the user determine whether it is cost effective to do so. The OPdex can also indicate when the relationship between the OPdex value and a required mean application response time is not linear.

Figure 13:
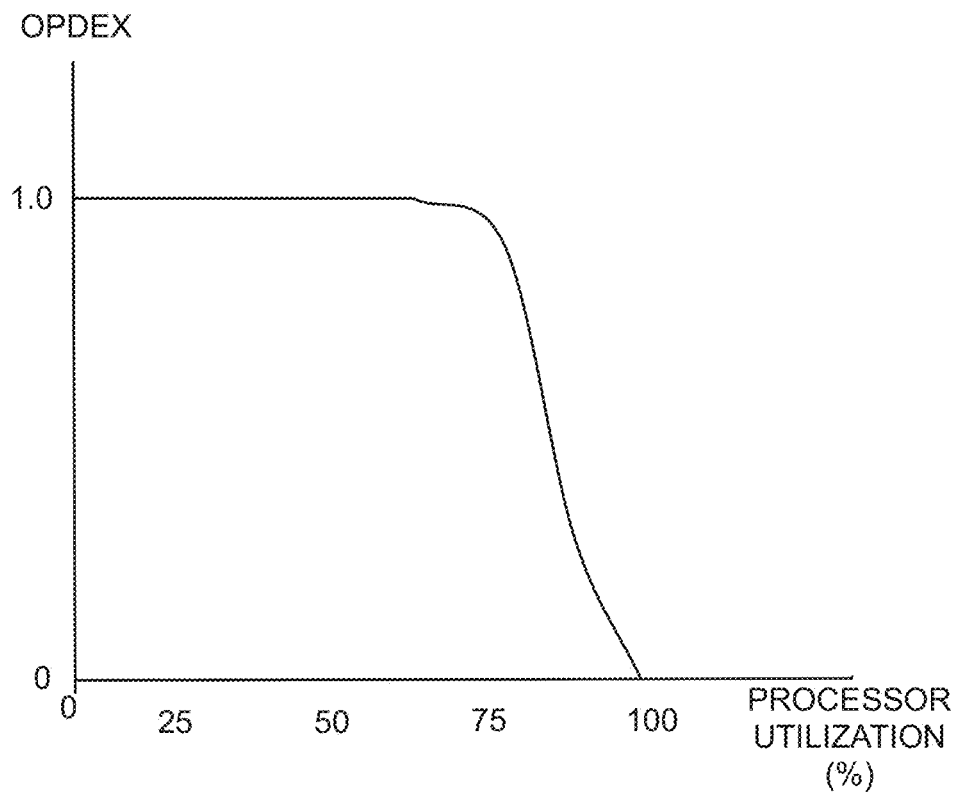
FIG. 13 shows an exemplary embodiment for OPdex that is based on processor utilization as a metric.
Figure 14:
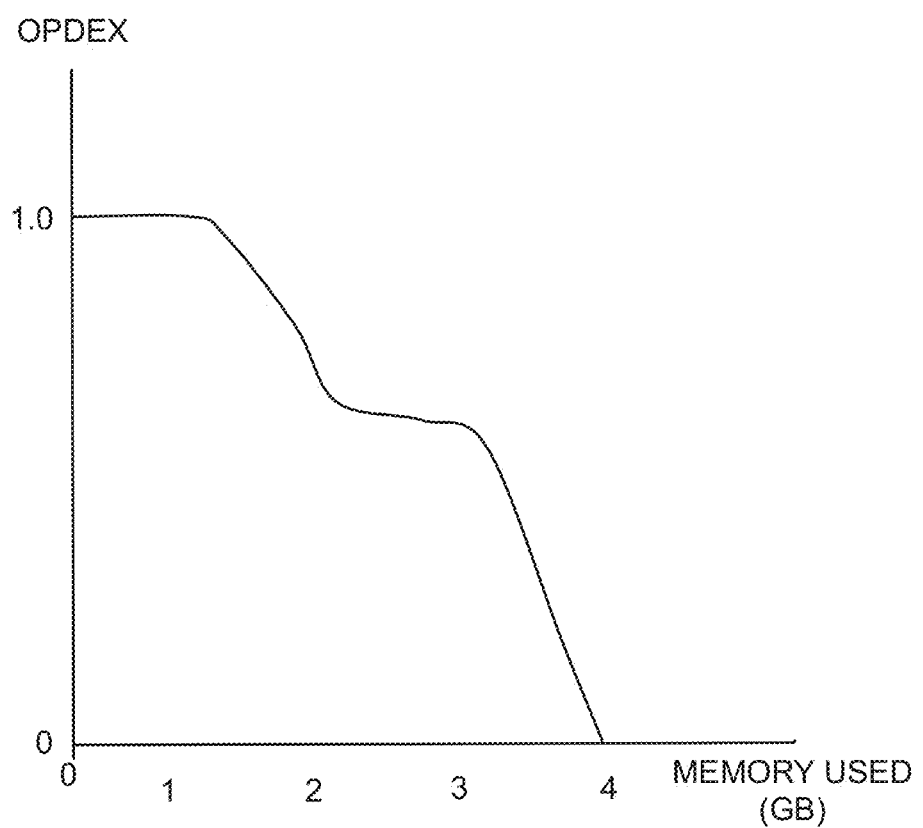
FIG. 14 shows an exemplary embodiment for OPdex that is based on memory used.
Figure 15:
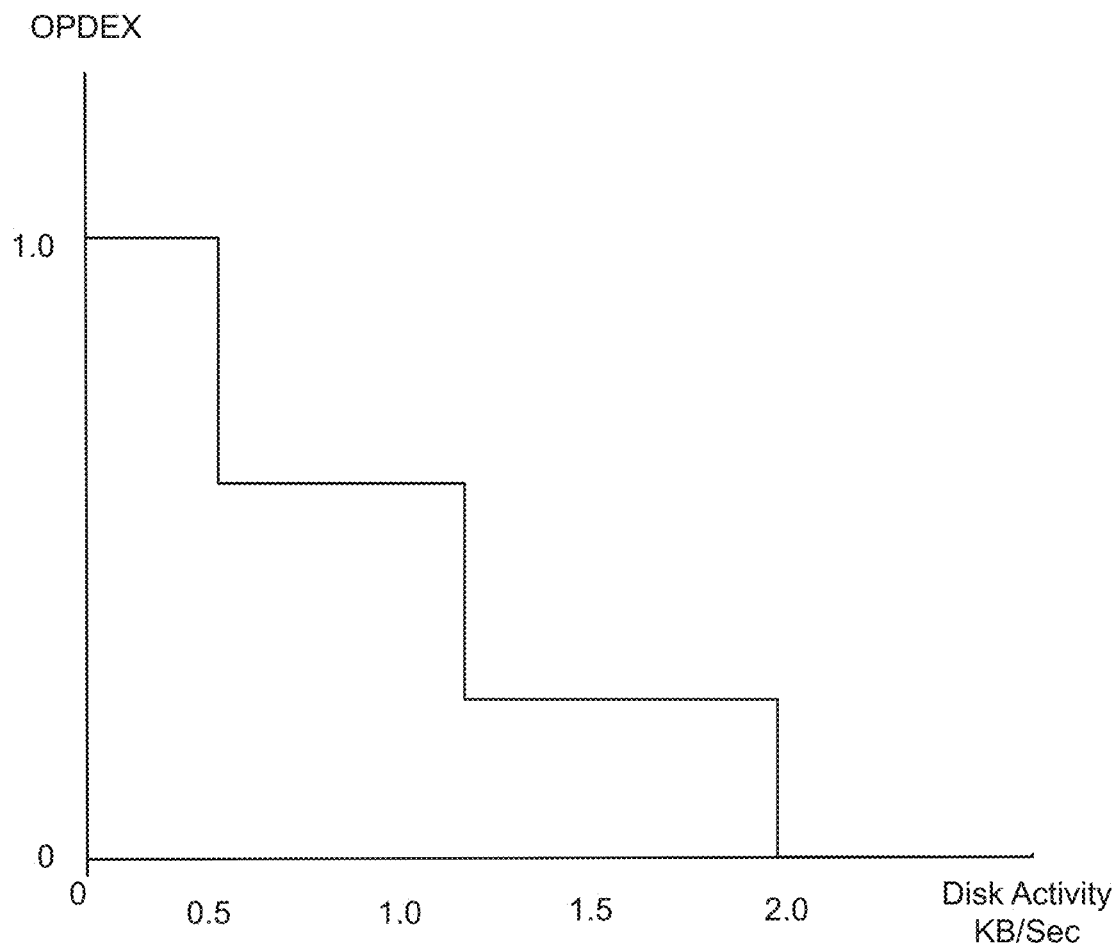
FIG. 15 shows an exemplary embodiment for OPdex that is based on disk activity.

In the embodiments, the OPdex employs various value functions to quantify user satisfaction for application performance metrics ranging between the hard and soft thresholds. Application performance metrics may be application response time, workload response time, transaction response time, processor utilization, memory utilization (such as amount of free memory, used memory, etc.), disk activity (such as data read and data writes), disk utilization, network traffic metrics, link utilization, and the like. For example, FIGS. 13-15 show exemplary OPdex indexes that are based on processor utilization, memory used, and disk activity. Any measurable application performance metric may be incorporated into the OPdex. In one embodiment, the OPdex quantifies user satisfaction for a range of application response times.

An OPdex may be calculated for various application performance metrics alone or in combination. For example, an individual OPdex may be reported for each application performance metric. Alternatively, OPdex scores for an individual metric may be combined with one or more other OPdex scores for other metrics and provided as an aggregated or weighted OPdex.

In one embodiment, users may enter weights for different OPdex scores for aggregation. For example, assuming that an OPdex $p_i$, and $0 \leq p_i \leq 1$. As such, a weight $w_i$, $w_i > 0$, $i=1, 2, \ldots n$ may then be assigned to each OPdex. A single aggregated OPdex score, p, may be calculated, for example, using a weighted sum $$p = \sum_{i=1}^{n} \frac{w_i}{\sum_{j=1}^{n} w_j} p_i.$$

For purposes of illustration, one embodiment of the OPdex is described with reference to application response time and user satisfaction levels for the application based on response time, r. Application response time may refer to the perceived time between a user (or software) request and the results for the request. Response time may also be known as round-trip time, reaction time, delay, or latency. In one embodiment, the application response time is from the users' perspective, which includes wait times and service times of software processes/threads at different hardware and software components supporting the application. The OPdex thus provides a single metric to reflect the application responsiveness and user experience across applications. As noted above, an OPdex can be used to quantify user satisfaction relative to performance metrics other than application response time.

In one embodiment, the OPdex quantifies user satisfaction based on application response time. The application response time, r, can be measured against a user's satisfaction level and the satisfaction level can be defined by service level objectives (SLOs). More specifically, users can define the soft threshold, T, below which users are satisfied and beyond which the users' satisfaction level decreases. User service level objectives can also be specified by an additional (optional) hard threshold, Z, beyond which the application response is too long (too late) and the application has zero value to users.

Accordingly, the measured application response time data can be divided into three mutually exclusive sets:

$\{x|x \leq T\}$: a set of response times less than or equal to the soft threshold T. Let $n_1 = |\{x|x \leq T\}|$ be the cardinality of the set.

$\{y|T < y \leq Z\}$: a set of response times greater than the soft threshold T and less than or equal to the hard threshold Z. Let $n_2 = |\{y|T < y \leq Z\}|$ the cardinality of the set.

$\{z|Z < z\}$: a set of response times greater than the hard threshold Z. Let $n_3 = |\{z|Z < z\}|$ be the cardinality of the set.

In this embodiment, the OPdex is assigned a value of "1" (i.e., a full value) to the response times less than the soft threshold, T, and assigned a value of "0" (i.e., zero value) to the response times greater than the hard threshold, Z. For response times between the hard and soft threshold, the OPdex may employ value functions to quantify the effect of application response time on user satisfaction.

Accordingly, the OPdex can be expressed as:

$$OPdex(T, Z, f) = \frac{|\{x | x \leq T\}| \times 1 + \sum_{y_i \in \{y|T<y\leq Z\}}^{n_2} f(y_i) + |\{z | Z < z\}| \times 0}{n_1 + n_2 + n_3} =$$

-continued $$\frac{n_1 + \sum_{\substack{i=1 \\ y_i \in \{y|T<y\leq Z\}}}^{n_2} f(y_i)}{n_1 + n_2 + n_3}$$

where $n_1$, $n_2$, and $n_3$ are for response times that are less than the soft threshold, T, between the soft and hard thresholds, and greater than the hard threshold, Z, respectively. f(.) is a value function and its value is less than 1.

As noted above, the OPdex is equal to "1" for response times that are less than the soft threshold and equal to "0" (zero) for response times that are greater than the hard threshold. The OPdex is equal to a value function, $f(y_i)$ for a response time $y_i$ that is between the soft and hard thresholds.

In one embodiment, the $f(y_i)$ is defined as:

$$f(y) = C\left(\frac{Z-y}{Z-T}\right)^n,$$

where C ($0 \leq C \leq 1$) and n are constants that users can define for desired sensitivity of the value function. With this particular embodiment, the OPdex can be defined as:

$$OPdex(T, Z, n, C) = \frac{n_1 + C\sum_{i=1}^{n_2} \left(\frac{Z-y_i}{Z-T}\right)^n}{n_1 + n_2 + n_3}.$$

The foregoing merely illustrates the principles of the invention. It will thus be appreciated that those skilled in the art will be able to devise various arrangements which, although not explicitly described or shown herein, embody the principles of the invention and are thus within its spirit and scope. Other system configuration and optimization features will be evident to one of ordinary skill in the art in view of this disclosure, and are included within the scope of the following claims.

In the following description, for purposes of explanation rather than limitation, specific details are set forth such as the particular architecture, interfaces, techniques, etc., in order to provide an understanding of the concepts of the invention. However, it will be apparent to those skilled in the art that the present invention may be practiced in other embodiments, which depart from these specific details.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. For example, for purposes of simplicity and clarity, detailed descriptions of well-known components, such as circuits, are omitted so as not to obscure the description of the present invention with unnecessary detail. To illustrate some of the embodiments, reference will now be made to the figures.

Figure 1A:
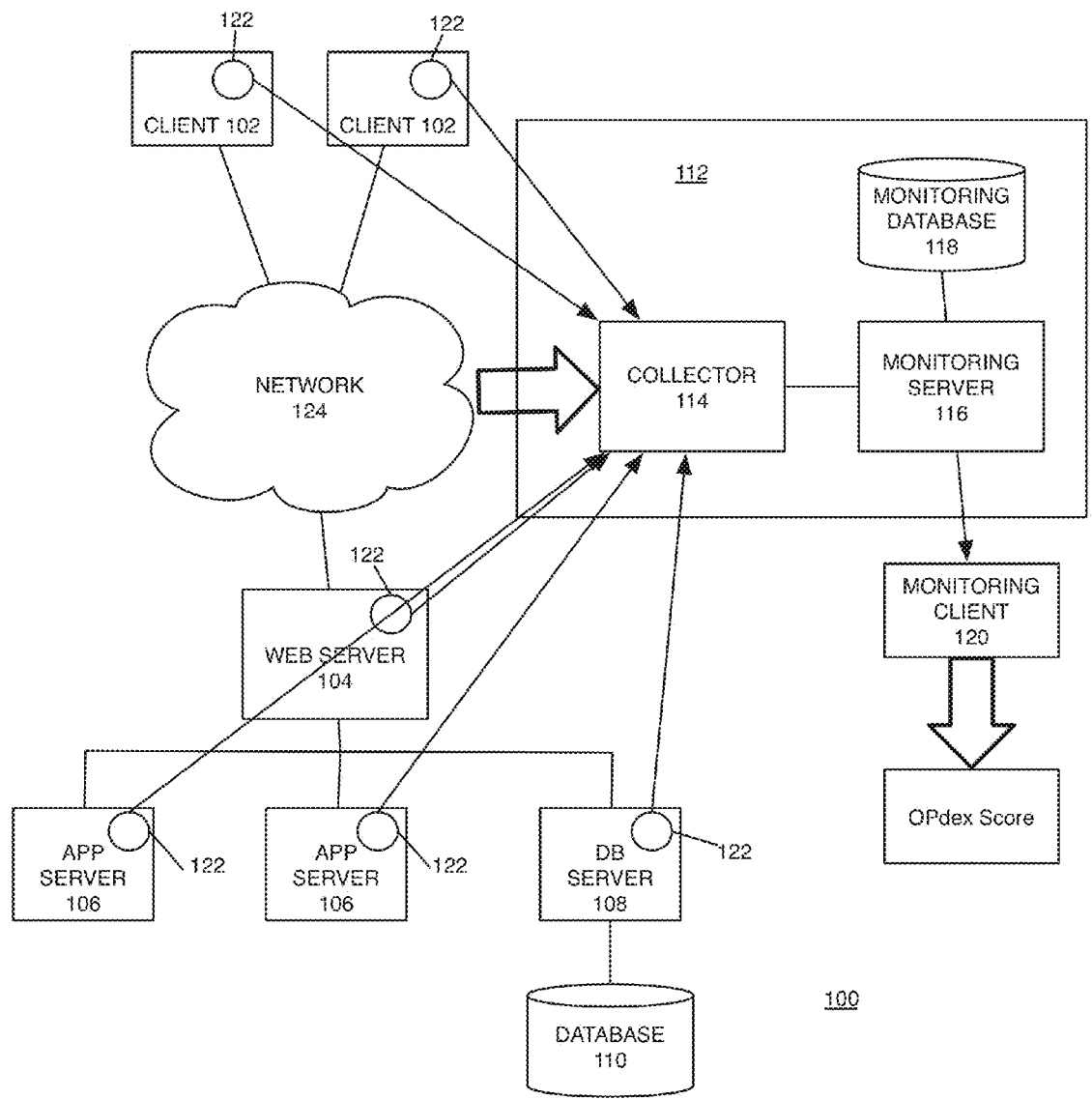
FIG. 1A illustrates an exemplary system in accordance with the principles of the present invention.
Figure 1B:
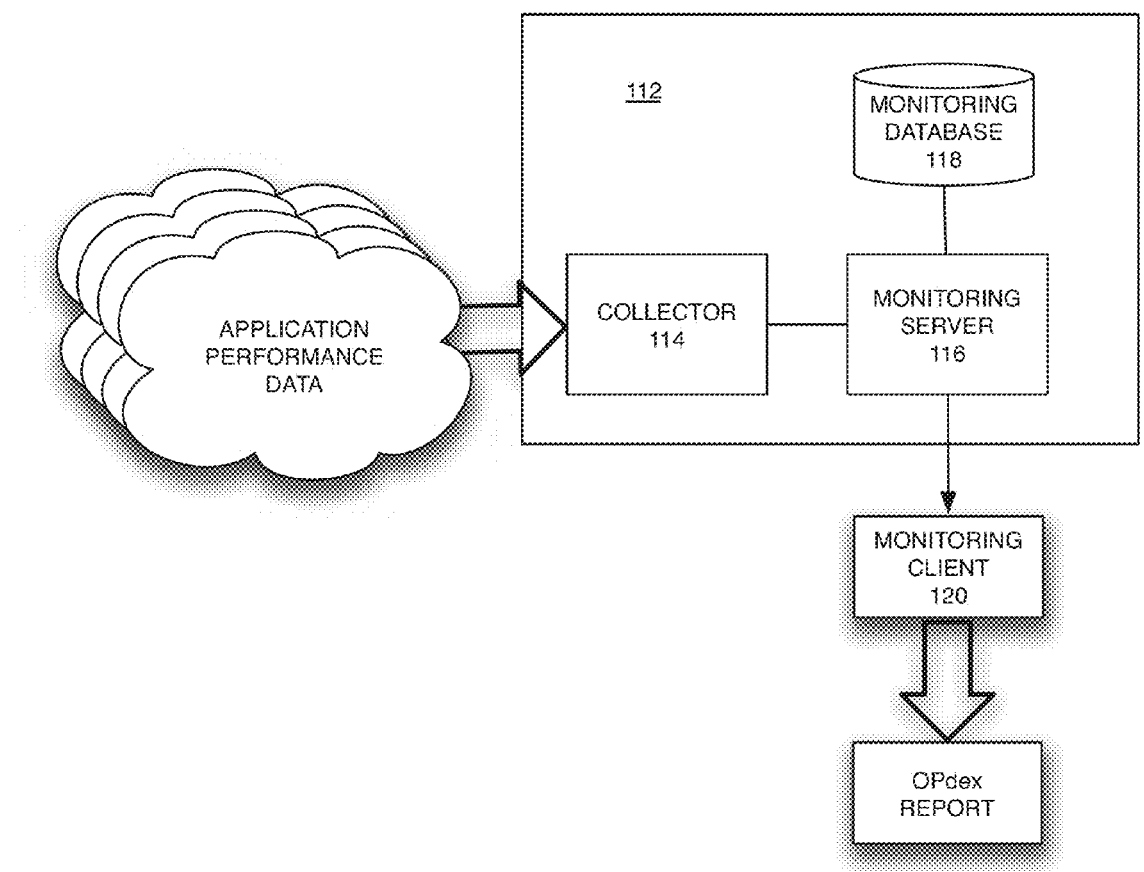
FIG. 1B illustrates another exemplary system in accordance with the principles of the present invention.
Figure 1C:
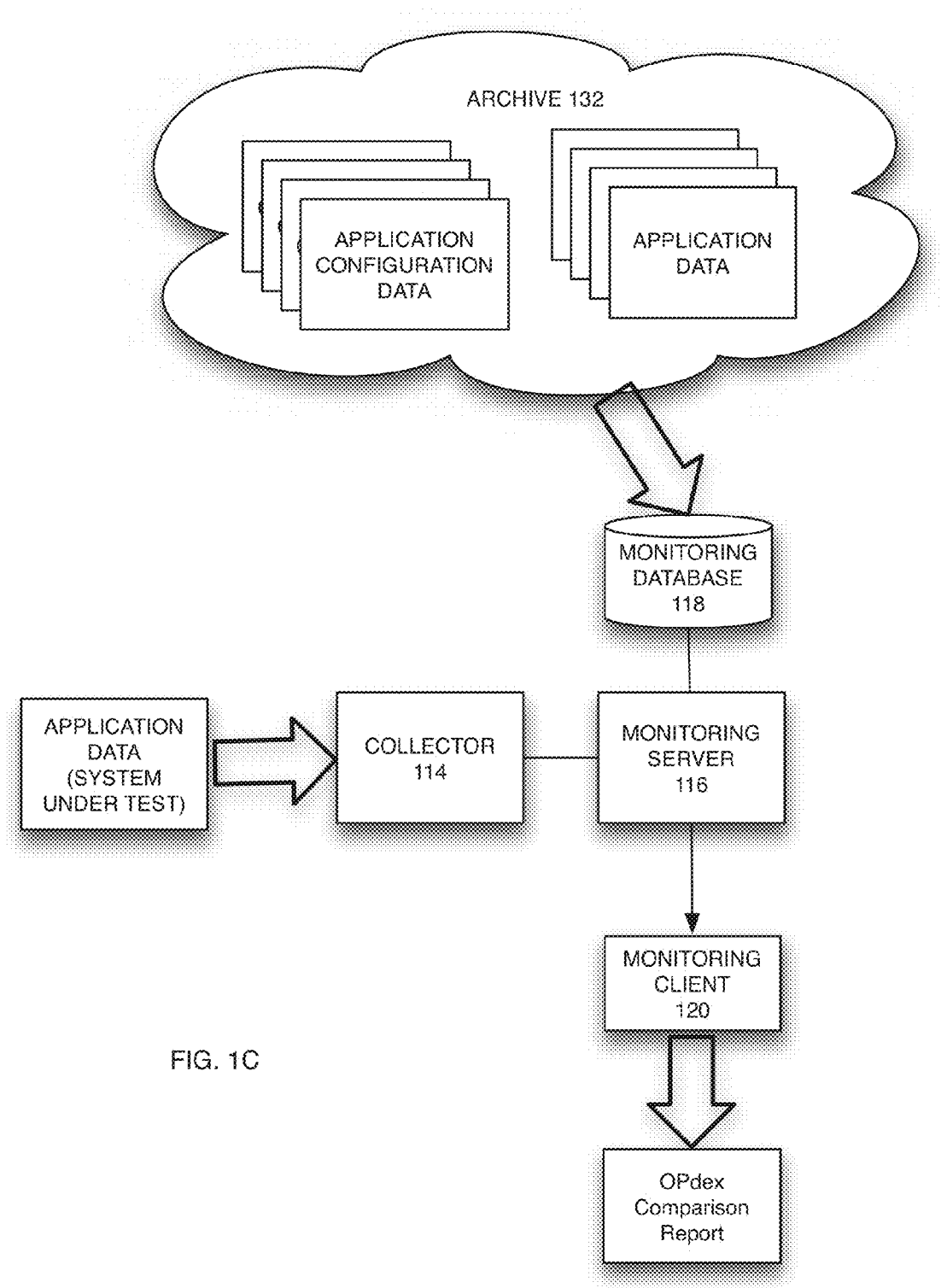
FIG. 1C illustrates another exemplary system in accordance with the principles of the present invention.

FIGS. 1A-1C illustrate various systems that may employ the OPdex. For example, FIG. 1A illustrates an exemplary system for collecting application performance data for an application running on a network and determining an OPdex score for the application. FIG. 1B illustrates another exemplary system for collecting application performance data for a plurality of applications and determining OPdex scores for those applications. FIG. 1C illustrates yet another exemplary system for troubleshooting an application relative to an archive of application configuration and performance data.

FIG. 1A illustrates an exemplary system to support an application and an application performance management system. As shown, the system 100 may comprise a set of clients 102, a web server 104, application servers 106, a database server 108, a database 110, and application performance management system 112. The application performance management system 112 may comprise a collector 114, a monitoring server 116, and a monitoring database 118. The application performance management system 112 may also be accessed via a monitoring client 120. These components will now be further described.

Clients 102 refer to any device requesting and accessing services of applications provided by system 100. Clients 102 may be implemented using known hardware and software. For example, clients 102 may be implemented on a personal computer, a laptop computer, a tablet computer, a smart phone, and the like. Such devices are well-known to those skilled in the art and may be employed in the embodiments.

The clients 102 may access various applications based on client software running or installed on the clients 102. The clients 102 may execute a thick client, a thin client, or hybrid client. For example, the clients 102 may access applications via a thin client, such as a browser application like Internet Explore, Firefox, etc. Programming for these thin clients may include, for example, JavaScript/AJX, JSP, ASP, PHP, Flash, Siverlight, and others. Such browsers and programming code are known to those skilled in the art.

Alternatively, the clients 102 may execute a thick client, such as a stand-alone application, installed on the clients 102. Programming for thick clients may be based on the .NET framework, Java, Visual Studio, etc.

Web server 104 provides content for the applications of system 100 over a network, such as network 124. Web server 104 may be implemented using known hardware and software to deliver application content. For example, web server 104 may deliver content via HTML pages and employ various IP protocols, such as HTTP.

Application servers 106 provide a hardware and software environment on which the applications of system 100 may execute. In some embodiments, application servers 106 may be implemented as Java Application Servers, Windows Servers implementing a .NET framework, or LINUX, UNIX, WebSphere, etc. running on known hardware platforms. Application servers 106 may be implemented on the same hardware platform as the web server 104, or as shown in FIG. 1A, they may be implemented on their own hardware.

In the embodiments, application servers 106 may provide various applications, such as mail, word processors, spreadsheets, point-of-sale, multimedia, etc. Application servers 106 may perform various transaction related to requests by the clients 102. In addition, application servers 106 may interface with the database server 108 and database 110 on behalf of clients 102, implement business logic for the applications, and other functions known to those skilled in the art.

Database server 108 provides database services access to database 110 for transactions and queries requested by clients 102. Database server 108 may be implemented using known hardware and software. For example, database server 108 may be implemented based on Oracle, DB2, Ingres, SQL Server, MySQL, etc. software running on a server.

Database 110 represents the storage infrastructure for data and information requested by clients 102. Database 110 may be implemented using known hardware and software. For example, database 110 may be implemented as a relational database based on known database management systems, such as SQL, MySQL, etc. Database 110 may also comprise other types of databases, such as, object oriented databases, XML databases, and so forth.

Application performance management system 112 represents the hardware and software used for monitoring and managing the applications provided by system 100. As shown, application performance management system 112 may comprise a collector 114, a monitoring server 116, a monitoring database 118, a monitoring client 120, and agents 122. These components will now be further described.

Collector 114 collects application performance information from the components of system 100. For example, collector 114 may receive information from clients 102, web server 104, application servers 106, database server 108, and network 124. The application performance information may comprise a variety of information, such as trace files, system logs, etc. Collector 114 may be implemented using known hardware and software. For example, collector 114 may be implemented as software running on a general-purpose server. Alternatively, collector 114 may be implemented as an appliance or virtual machine running on a server.

Monitoring server 116 hosts the application performance management system. Monitoring server 116 may be implemented using known hardware and software. Monitoring server 116 may be implemented as software running on a general purpose server. Alternatively, monitoring server 116 may be implemented as an appliance or virtual machine running on a server.

Monitoring database 118 provides a storage infrastructure for storing the application performance information processed by the monitoring server 116. Monitoring database 118 may be implemented using known hardware and software.

Monitoring client 120 serves as an interface for accessing monitoring server 116. For example, monitoring client 120 may be implemented as a personal computer running an application or web browser accessing the monitoring server 120. As shown, in one embodiment, monitoring client 120 is configured to provide information indicating an OPdex score for the one or more applications running on system 100.

For example, Table 1 below illustrates a set of OPdex scores for a plurality of applications that may be running on system 100. In one embodiment, Table 1 may be displayed in the form of a web page or other type of interactive display.

TABLE 1

Exemplary OPdex score report

| Application | OPdex |
|---|---|
| Application #1 | 0.7 |
| Application #2 | 0.5 |
| Application #3 | 0.8 |
| Application #4 | 0.2 |
| Application #5 | 0.8 |
| Combined | 0.6 |

As shown in the example of Table 1, the applications 1-5 may be assigned individual OPdex scores that range from 0-1. In addition, the OPdex scores for the applications may be combined, for example, averaged to provide a combined or aggregate OPdex score.

The monitoring server 116 may determine the most appropriate value function for a particular metric for a particular application. The monitoring server 116 may determine a value function based on analyzing the various application metrics and the corresponding user satisfaction reported to the monitoring server 116. This process may be performed periodically, upon request, or some other automated process.

In one embodiment, a user at monitoring client 120 may navigate through a hierarchy of OPdex scores into successive levels of details. Based on the information provided at these levels of details, a user or administrator may thus identify which of the applications is suffering from poor performance. For example, as shown above, application #4 has an OPdex score of 0.2, which may indicate a performance issue with this application. Accordingly, a user or administrator may perform various troubleshooting processes on application #2.

In one embodiment, the use of one or more OPdex scores may be used to troubleshoot an application performance problem. In particular, the collector 114 may collect information about a variety of metrics, such as latency, processor utilization, memory utilization, etc. Monitoring server 116 may then calculate respective OPdex scores for these metrics on the same scale, such as 0-1. Alternatively, monitoring server 116 may be configured to calculate OPdex scores for metrics using different scales, such as 0-1, 0-10, 0-100, and the like. In addition, the OPdex scores for the metrics may be combined into a single score or provided as a set of scores in a report via monitoring client 120.

In one embodiment, as shown, the OPdex scores for the various metrics may be ranked according to a severity or significance of their impact on the OPdex score. A user may thus navigate into successive levels of detail to investigate the underlying cause of poor application performance.

Agents 122 serve as instrumentation for the application performance management system. As shown, the agents 122 may be distributed and running on the various components of system 100. Agents 122 may be implemented as software running on the components or may be a hardware device coupled to the component. For example, agents 122 may implement monitoring instrumentation for Java and .NET framework applications. In one embodiment, the agents 122 implement, among other things, tracing of method calls for various transactions. In particular, in some embodiments, agents 122 may interface known tracing configurations provided by Java and the .NET framework to enable tracing continuously and to modulate the level of detail of the tracing. The agents 122 may also comprise various monitoring probes for other application metrics and data. For example, agents 122 may record network traffic, for example, to permit packet tracing. Any form of application information and performance data may be collected by system 100 and agents 122.

Network 124 serves as a communications infrastructure for the system 100. Network 124 may comprise various known network elements, such as routers, firewalls, hubs, switches, etc. In the embodiments, network 124 may support various communications protocols, such as TCP/IP. Network 124 may refer to any scale of network, such as a local area network, a metropolitan area network, a wide area network, the Internet, etc.

FIG. 1B shows another exemplary system. In this embodiment, the collector 114 is configured to receive application performance data from a plurality of systems. Thus, collector 114 may aggregate application performance data, such as response time, and determine its effect on user satisfaction. In one embodiment, the monitoring server 116 is configured to determine the most appropriate value function for a particular metric for a particular application. A user may assist the monitoring server 116 empirically by observing metrics and the corresponding user satisfaction and entering appropriate input via monitoring client 120. The monitoring server 116 to determine one or more value functions would then use this input. In another embodiment, the monitoring server 116 employs an automated process, such as a modeling or curve fitting process, to select a value function and then compute the OPdex.

A user or monitoring server 116 may use parameters n and C to set targeted performance values at some points after the soft threshold is exceeded and before the hard threshold is reached. For example, a user can specify that when the metric value exceeds the soft threshold by one third of the distance between soft and hard thresholds (Z−T), the performance value drops to one-fourth (¼). In addition, the user can also make another performance value specification: e.g., when the metric value exceeds the soft threshold by two-thirds (⅔) of the distance between soft and hard thresholds (Z−T), the performance value drops to one-thirty-second (1/32). In this example, the following simultaneous equations result:

$$\begin{cases} C\left(\frac{Z-y}{Z-T}\right)^n \Big|_{y=T+\frac{Z-T}{3}} = \frac{1}{4} \\ C\left(\frac{Z-y}{Z-T}\right)^n \Big|_{y=T+\frac{2(Z-T)}{3}} = \frac{1}{32}. \end{cases}$$

Figure 5:
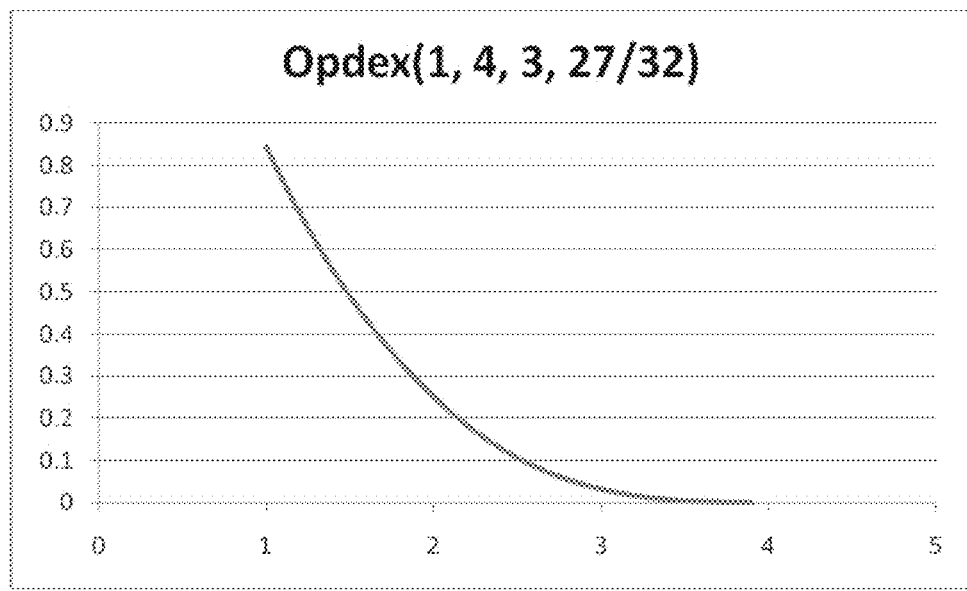
FIG. 5 shows an exemplary value function for one embodiment of an OPdex.

The monitoring server 116 may be configured to solve the above simultaneous equations and determine the values for n and C of OPdex(T,Z,n,C). In this particular example, the solution is n=3 and C=27/32. FIG. 5 shows the performance value function OPdex(T,Z,3,27/32), where T=1 and Z=4.

As another example, a user may specify that the performance value of OPdex drops to one-half (½) for both of the response times, $$T + \frac{Z-T}{3} \text{ and } T + \frac{2(Z-T)}{3}$$

between soft and hard thresholds, i.e., between Z and T.

These parameters thus result in the following simultaneous equations:

$$\begin{cases} C\left(\frac{Z-y}{Z-T}\right)^n \Big|_{y=T+\frac{Z-T}{3}} = \frac{1}{2} \\ C\left(\frac{Z-y}{Z-T}\right)^n \Big|_{y=T+\frac{2(Z-T)}{3}} = \frac{1}{2}. \end{cases}$$

By solving the above simultaneous equations, the monitoring server 116 can determine the values for n and C of OPdex (T,Z,n,C). In this example, the solution is n=0 and C=½. Therefore, the OPdex can be expressed as:

$$OPdex\left(T, Z, 0, \frac{1}{2}\right) = \frac{n_1 + \frac{n_2}{2}}{n_1 + n_2 + n_3}.$$

Figure 6:
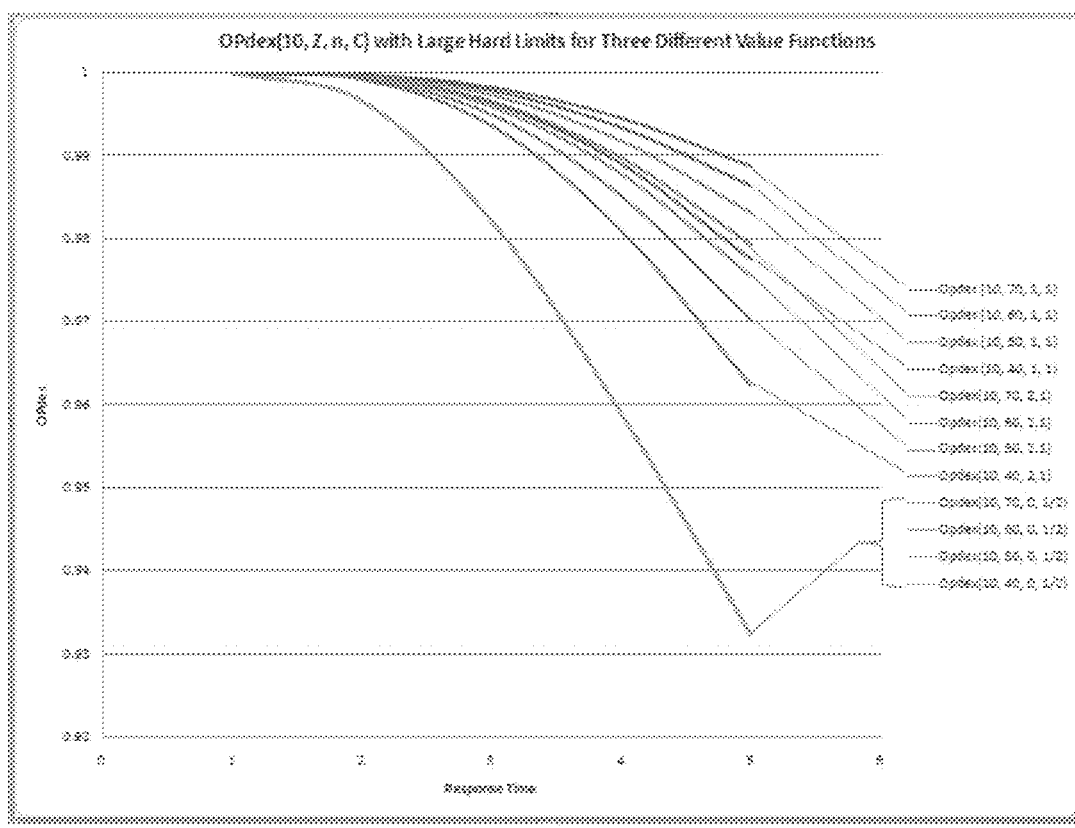
FIG. 6 shows a comparison of three groups of OPdex models.

FIG. 6 shows the performance value function for OPdex(T, Z,0,½), where T=10 and Z=40.

The OPdex can have other forms of representations depending on the user's focus and interest in performance modeling. For example, the mean response time can be represented by the soft threshold and OPdex value by solving for mean response time r̄, where $$\bar{r} = -\frac{T}{\ln X},$$

$X>0$, where X is the positive real root of $2\{1-\text{OPdex}\}=X+X^m$, assuming the hard threshold $Z=mT$, where m is an integer.

As another example, the hard threshold Z can be expressed as:

$$Z = T - \bar{r}\ln\left[2(1-\text{OPdex})e^{\frac{T}{\bar{r}}} - 1\right],$$

under the condition $$\begin{cases} 2(1-\text{OPdex})e^{\frac{T}{\bar{r}}} - 1 > 0 \\ \ln\left[2(1-\text{OPdex})e^{\frac{T}{\bar{r}}} - 1\right] < 0. \end{cases}$$

That is, the mean application response time $\bar{r}$ is constrained by a lower bound and an upper bound:

$$\frac{T}{-\ln(1-\text{OPdex})} < \bar{r} < \frac{T}{-\ln[2(1-\text{OPdex})]}.$$

The upper bound of the mean response time is a numerical value beyond which the desired OPdex goal cannot be achieved regardless of how large the hard threshold Z is defined. The lower bound for the mean response time is also a numerical value. If the mean response time is smaller than the lower bound, the hard threshold Z could be defined to be smaller than the soft threshold T, which is not possible in a real application or system. Therefore, given an application response time soft threshold T and an OPdex value, the embodiments may indicate how to provision the system so that the average application response time is plausible. For example, it can be seen that When $$\bar{r} \to \frac{T}{-\ln[2(1-\text{OPdex})]},$$

then $$Z \to T - \bar{r}\ln\{2(1-\text{OPdex})e^{-\ln\{2(1-\text{OPdex})\}} - 1\} \to \infty.$$

As shown above, when mean response time approaches the upper bound for a given soft threshold T and an OPdex value, the hard threshold Z becomes unbound. In other words, after a certain point, the relationship between mean response time and the OPdex value becomes non-sensitive to the value of the hard threshold. Thus, it does not make practical sense to select a large hard threshold for achieving a desired OPdex value.

Similarly, it does not make sense to make the mean response time smaller than the lower bound. In that case, the hard threshold Z will be the same as or smaller than the soft threshold T:

When $$\bar{r} \to \frac{T}{-\ln(1-\text{OPdex})},$$

then $$Z \to T - \bar{r}\ln\{2(1-\text{OPdex})e^{-\ln(1-\text{OPdex})} - 1\} \to T.$$

Accordingly, a lower average response time means a faster system with higher costs. The analytical results presented by the embodiments could thus help IT professionals to achieve desired application performance goal without over-provisioning.

Figure 10:
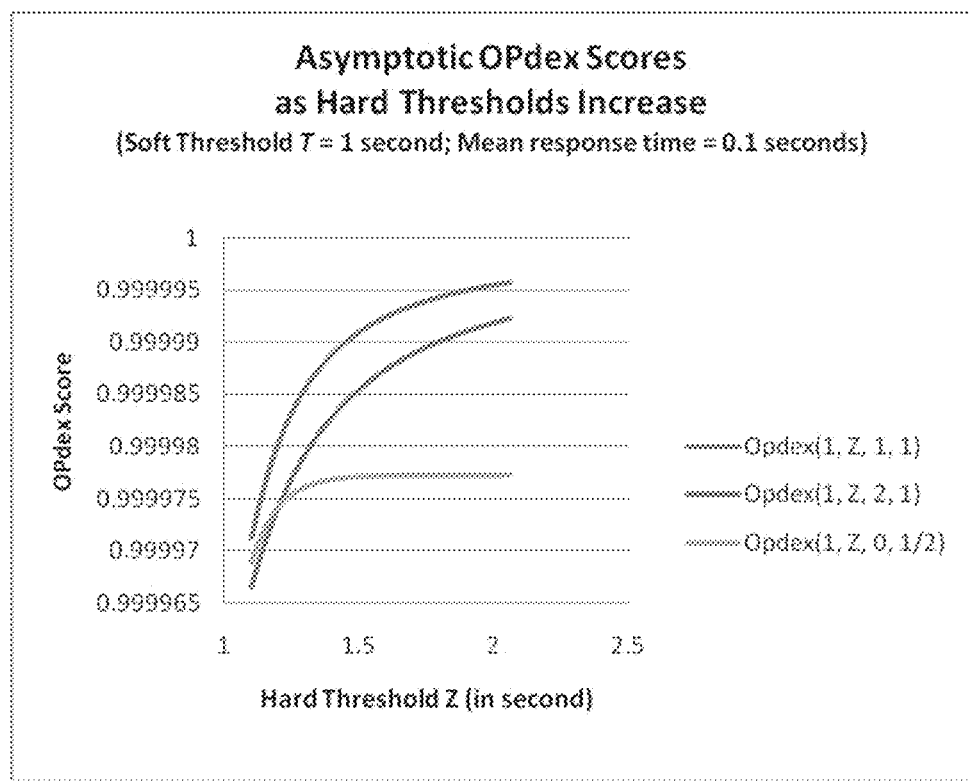

FIG. 10 shows another exemplary system. In this embodiment, an application or system is under test for diagnostic or troubleshooting purposes. For example, the collector 114 may receive application performance data from a system or application under test. The monitoring server 116 may then query its monitoring database 118 for past data and/or data from comparable systems. A user at monitoring client 120 may then employ a user interface, such as one or more web pages, to determine an OPdex score for a number of performance metrics and rank the metrics according to severity.

In this embodiment, the OPdex model can be used for comparing different value functions used by OPdex and can assist in troubleshooting a system or application under test. For example, various troubleshooting functions can be performed based on the relationship between the OPdex value and application/system performance metrics, such as application response times, soft and hard thresholds, service rate, and utilization of the system that supports the applications.

In one embodiment, the system or application under test is assumed to have exponential service time distribution and that the transaction inter-arrival time is also exponentially distributed. Thus, the application response time is a continuous random variable and can be measured. In a steady-state, the probability density function (pdf) of the response time can be modeled as:

$\mu(1-\rho)e^{-\mu(1-\rho)y}$, where $\mu$ is the system service rate (i.e., $1/\mu$ is the service time), $\rho=\lambda/\mu$ is the system utilization, and $\lambda$ is the throughput of the system. For an unsaturated system, the throughput is equal to the arrival rate.

The OPdex is assigned a value for "1" (i.e., the maximum value) for the response time that is less than or equal to the soft threshold T. Therefore, the expected value with a weight of 1 can be computed as $$\bar{P}_1(r \leq T) = \int_0^T 1 \times \mu(1-\rho)e^{-\mu(1-\rho)y}dy = 1 - e^{-\mu(1-\rho)T}.$$

Similarly, the expected value with a weight f(y) for the response times greater than the soft threshold T and less than or equal to the hard threshold Z can be computed as $$\bar{P}_{f(y)}(T < r \leq Z) =$$
$$\int_T^Z f(y)\mu(1-\rho)e^{-\mu(1-\rho)y}dy = C\int_T^Z \left(\frac{Z-y}{Z-T}\right)^n \mu(1-\rho)e^{-\mu(1-\rho)y}dy,$$
$$\text{where } f(y) = C\left(\frac{Z-y}{Z-T}\right)^n$$

is the value function for the response times between soft and hard threshold, i.e., $T<y\leq Z$. Since $0\leq C\leq 1$ and $T<y\leq Z$, $0\leq f(y)<1$.

And finally, by OPdex definition, the application has 0 value when it exceeds the hard limit Z, which results in the following:

$\overline{P}_0(r>Z)=\int_Z^\infty 0 \times \mu(1-\rho)e^{-\mu(1-\rho)y}dy=0$. Therefore, by putting these three sets of expected values together, the OPdex can be modeled as:

$$OPdex_{Model}(T, Z, n, C) = \overline{P}_1(r \leq T) + \overline{P}_{f(y)}(T < r \leq Z) + \overline{P}_0(r > Z) = \overline{P}_1(r \leq T) + \overline{P}_{f(y)}(T < r \leq Z).$$

$$OPdex_{Model}(T, Z, n, C) = 1 - e^{-\frac{T}{\overline{r}}} - aCe^{-\frac{Z}{\overline{r}}}\left\{\frac{(-1)^n n!}{a^{n+1}} - \frac{e^a}{a^{n+1}}[a^n - na^{n-1} + n(n-1)a^{n-2} - \ldots + (-1)^n n!]\right\},$$

where $a = \frac{Z-T}{\overline{r}}$ and $\overline{r} = \frac{1}{\mu(1-\rho)}$ is the average response time of a system with exponential distribution for service and inter-arrival times.

Thus, the above OPdex model expression establishes the relationships between the OPdex value and mean response time, application throughput, and system utilization. It also provides a mechanism for examining the quantitative influence of soft and hard thresholds on the OPdex value.

As a special case of model for n=1 and C=1, the model becomes:

$$OPdex_{Model}(T, Z, 1, 1) = 1 - \frac{\overline{r}\left(e^{-\frac{T}{\overline{r}}} - e^{-\frac{Z}{\overline{r}}}\right)}{Z-T} = 1 - \frac{e^{-\mu(1-\rho)T} - e^{-\mu(1-\rho)Z}}{\mu(1-\rho)(Z-T)}.$$

Figure 3:
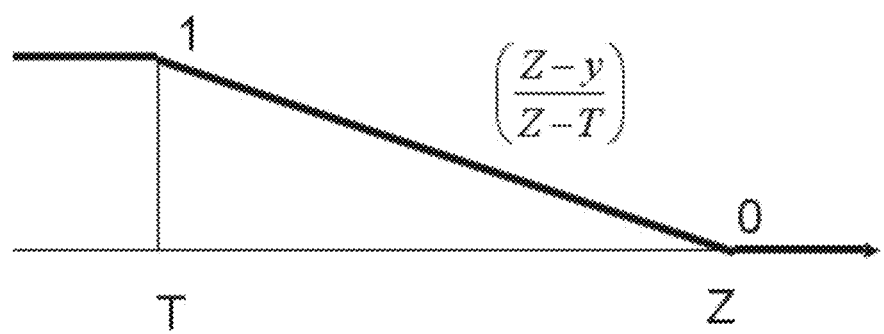
FIG. 3 shows an OPdex where the OPdex value decreases linearly after the response time exceeds a soft threshold.

This model has a value function shown in FIG. 3.

As another special case of model for n=0, i.e., the value function becomes a constant for response times between T and Z, and the following representation for the OPdex results:

$$OPdex_{Model}(T, Z, 0, C) =$$
$$1 - (1-C)e^{-\frac{T}{\overline{r}}} - Ce^{-\frac{Z}{\overline{r}}} = 1 - (1-C)e^{-\mu(1-\rho)T} - Ce^{-\mu(1-\rho)Z}.$$

More specifically, if C=½, the model becomes:

$$OPdex_{Model}\left(T, Z, 0, \frac{1}{2}\right) = 1 - \frac{e^{-\frac{T}{\overline{r}}} + e^{-\frac{Z}{\overline{r}}}}{2} = 1 - \frac{e^{-\mu(1-\rho)T} + e^{-\mu(1-\rho)Z}}{2}.$$

Figure 2A:
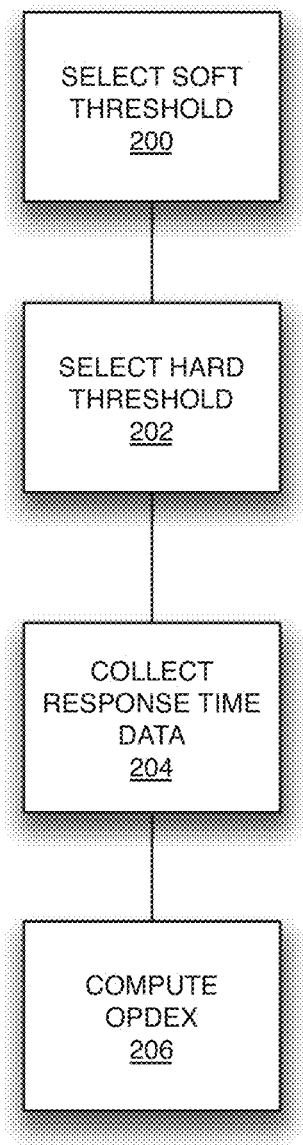
FIG. 2A shows an exemplary process flow for determining an OPdex.

FIG. 2A shows an exemplary process flow for computing an OPdex. As shown, in phase 200, a user at monitoring client 120 may select a soft threshold, Z. In phase 202, a user at monitoring client 120 may select a hard threshold, T.

The soft and hard thresholds for response time depend on user expectations, the nature of the applications, and service level objectives. For instance, when concerning end-user oriented transaction processing applications, it is commonly accepted that 0.1 seconds is about the limit for the user to feel that the system is reacting instantaneously, 1 second is about the limit for the user's flow of thought to stay uninterrupted, even though the user will notice the delay, 10 seconds is about the limit for keeping the users attention focused on the dialogue. For longer delays, users will want to perform other tasks while waiting for the computer to finish.

In this case, a user or monitoring server 116 can select T=1 second and Z=4 seconds or Z=10 seconds. In order to achieve a desired OPdex score, the system is assumed to be provisioned with enough computing power to produce the mean response time that is compatible with the soft threshold. For example, if T=1 second as the soft threshold beyond which the user's satisfaction starts to drop, it is a mismatch to have a system that produces an average response time of 1 minute, i.e., $\overline{r}$=60 seconds. Accordingly, the embodiments can help users to determine a reasonable range of processing power needed for setting sensible response time thresholds.

In phase 204, the collector 114 may collect application data, such as response times, from the system under test. Such collection is shown with reference to FIGS. 1A-1C.

In phase 206, the monitoring server 116 may compute the OPdex based on the response times and user input. The monitoring server 116 may store these OPdex values, for example, in monitoring database 118 for future reference, display, or for availability to other software components or tools.

The following three examples illustrate how the above OPdex analytical representations can be used in practice.

In a first example, it is assumed that the application response time soft threshold, T, is 10 seconds. To obtain an OPdex value/score 0.94, the average response time, $\overline{r}$, of the application has to be in the range of:

$$\frac{10}{-\ln(1-0.94)} < \overline{r} < \frac{10}{-\ln[2(1-0.94)]}.$$

That is $$3.554404602 < \overline{r} < 4.716394839.$$

If the average response time is within the above range, then the hard threshold Z can be defined as $$Z = 10 - \overline{r}\ln\left[2(1-0.94)e^{\frac{10}{\overline{r}}} - 1\right].$$

Of note, the hard threshold value Z is very sensitive to the required mean response time values and this implies that the Z value beyond certain bounds makes neither practical nor theoretical sense.

Table 3 shows that, for a given OPdex value 0.94, as the mean response time $\overline{r}$ approaches the lower bound or upper bound, the hard threshold Z varies from T=10 to an unbounded value. Therefore, choosing the hard threshold Z to be larger than 4 T will not have any meaningful improvement in the OPdex value.

TABLE 3

| Mean Response Time, $\overline{r}$ | Hard Threshold Z |
|---|---|
| $\frac{10}{-\ln(1-0.94)} = 3.55440460$ | 10 (= T) |
| 2 | |
| 3.954404602 | 12.70435653 |

TABLE 3-continued

| Mean Response Time, $\bar{r}$ | Hard Threshold Z |
|---|---|
| 4.454404602 | 18.99255405 |
| 4.674404602 | 28.47016776 |
| 4.694404602 | 31.62720397 |
| 4.712577142 | 40 (= 4T) |
| 4.714404602 | 43.08633392 |
| 4.716394000 | 79.75665669 |
| 4.716394800 | 94.2000379 |
| 4.716394830 | 101.0138468 |
| 4.716394839 | 117.908464 |
| ... | ... |
| $\frac{10}{-\ln[2(1-0.94)]}$ | ∞ |

As another example for a lower OPdex value of OPdex=0.85, it can again be assumed the application target time, T, is 10 seconds. To obtain an OPdex value of 0.85, the average response time, $\bar{r}$, of the application has to be in the range of $$\frac{10}{-\ln(1-0.85)} < \bar{r} < \frac{10}{-\ln[2(1-0.85)]}.$$

That is, $$5.271147887 < \bar{r} < 8.305835451.$$

If the average response time is within the above range, the hard threshold, Z can be defined as $$Z = 10 - \bar{r}\ln\left[2(1-0.85)e^{\frac{10}{\bar{r}}} - 1\right].$$

Accordingly, Table 4 shows that, for a given OPdex value 0.85, as the mean response time $\bar{r}$ approaches the lower bound or upper bound, the hard threshold Z varies from T=10 to an unbounded value.

TABLE 4

| Mean Response Time, $\bar{r}$ | Hard Threshold, Z |
|---|---|
| $\frac{10}{-\ln(1-0.85)} = 5.27114788$ | 10 (= T) |
| 7 | |
| 5.771147887 | 12.08429605 |
| 6.271147887 | 14.63014278 |
| 6.771147887 | 17.84894846 |
| 7.771147887 | 29.03277466 |
| 8.138477667 | 40 (= 4T) |
| 8.271147887 | 53.72124571 |
| 8.291147887 | 60.98433472 |
| 8.302147887 | 72.54347891 |
| 8.305147887 | 86.51993739 |
| 8.305835451 | 199.759407 |
| ... | ... |
| $\frac{10}{-\ln[2(1-0.85)]}$ | ∞ |

Both Tables 3 and 4 also show that, to achieve OPdex values of 0.94 or 0.85, the mean response time has to be smaller than the soft threshold (T=10), regardless of the hard threshold Z value. Therefore, if the mean response time is too large, i.e., greater than the soft threshold T, picking a large hard threshold will not help achieve a desired performance goal.

Comparing the mean response time values, $\bar{r}$, in Table 1 and 2, the mean response time for an OPdex value 0.94 is much smaller than the response time for an OPdex value 0.85. In other words, it is much harder to achieve a higher OPdex rating because the relationship between OPdex value and the mean response time is not linear. The above two examples have a relatively high OPdex value/score. Accordingly, a third example is provided for a medium OPdex value of 0.70.

In this example, it is again assumed that the application response time soft threshold, T, is 10 seconds. To obtain an OPdex value of 0.70, Table 5 shows that as the mean response time $\bar{r}$ approaches the lower bound or upper bound, the hard threshold Z varies from T=10 to an unbounded value.

TABLE 5

| Mean Response Time, $\bar{r}$ | Hard Threshold, Z |
|---|---|
| $\frac{10}{-\ln(1-0.70)} = 8.30583545$ | 10 (= T) |
| 1 | |
| 9.305835451 | 12.58719094 |
| 10.30583545 | 15.55575763 |
| 11.30583545 | 18.95111604 |
| 12.30583545 | 22.83880218 |
| 13.30583545 | 27.31524768 |
| 15.49120259 | 40 (= 4T) |
| 18.30583545 | 70.81023446 |
| 19.56583545 | 170.819309 |
| 19.57613545 | 297.023319 |
| 19.57615100 | 354.1175466 |
| 19.57615180 | 399.0309594 |
| 19.57615189 | 442.5531651 |
| ... | ... |
| $\frac{10}{-\ln[2(1-0.70)]}$ | ∞ |

Given an OPdex value 0.70 and the response time soft threshold T=10, the table shows the maximum mean response time values $\bar{r}$ and the corresponding minimum hard threshold Z. Of note, as Table 5 shows, in order to achieve a moderate OPdex value, such as 0.7, the required mean response time, $\bar{r}$, could be greater than the application response time soft threshold, T=10. For Z=4 T=40, the mean response time could be 50% larger than the soft threshold (highlighted in Table 5) and the OPdex value would still be in the middle range.

The three examples show that, as the OPdex value lowers from 0.94 to 0.7, the demand for a lower mean response time reduces significantly. Capacity planning tools of the embodiments can thus help choose the proper system that delivers the required mean response time for a predefined OPdex score/value. The above three examples all assume that the hard threshold is four times as large as the soft threshold, Z=4 T for purposes of illustration. Other ratios or relationships may be used in the embodiments.

Various examples of the OPdex and its uses will now be described with reference to FIGS. 3-12 below.

Figure 2B:
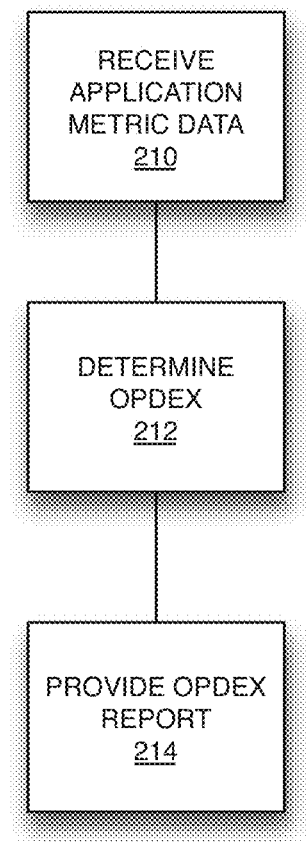
FIG. 2B shows an exemplary process flow for troubleshooting an application based on one or more OPdex scores.

FIG. 2B shows an exemplary process flow for troubleshooting an application based on one or more OPdex scores.

In phase 210, the collector 114 may collect information about a variety of metrics, such as latency, processor utilization, memory utilization, etc.

In phase 212, the monitoring server 116 may then calculate respective OPdex scores for these metrics on the same scale, such as 0-1, or on different scales for each metric, such as 0-1, 0-10, 0-100, and the like.

In phase 214, the monitoring client 120 may provide the OPdex scores for the metrics. As shown below in Table 2, the OPdex scores for the metrics may be combined into a single score or provided as a set of scores in a report via monitoring client 120. In addition, the OPdex scores for the various metrics may be ranked according to a severity or significance of their impact on the OPdex score.

Table 2 below shows an exemplary set of OPdex scores for different metrics. As shown below, Table 2 indicates a combined OPdex which is based on respective OPdex values for response time, processor utilization, memory, and link utilization. In the example shown, the OPdex values range on a common scale of 0 to 1 and the combined OPdex is calculated as an average of these OPdex scores. In other embodiments, the combined OPdex score may be calculated in various ways to accommodate any number of sub-OPdex scores, such as a weighted average, a weighted sum, etc., regardless of whether each sub-OPdex score varies on the same range.

TABLE 2

| METRIC | OPdex | Ranking |
| --- | --- | --- |
| Combined OPdex | 0.664 | |
| Response Time | 0.738 | 2 |
| Processor Utilization | 0.552 | 3 |
| Memory | 0.985 | 1 |
| Link Utilization | 0.380 | 4 |

Table 2 also illustrates that sub-OPdex scores that are part of a combined OPdex may be ranked according to their respective severity or influence on the combined OPdex. The extent of the severity may be manually or automatically determined based on the history of metric data stored in monitoring database 118, for example, by monitoring server 116. For example, application response time and memory may have a significant impact or severity on the combined OPdex. A user may thus navigate into successive levels of detail to investigate the underlying cause of poor application performance. For example, as shown above, the memory metric has an OPdex score of 0.985, which may indicate a performance issue with this metric. Accordingly, a user or administrator may perform various troubleshooting processes that focus on this metric, such as, querying monitoring database 118.

FIG. 3 shows an OPdex where the OPdex value decreases linearly after the response time exceeds the soft threshold, T, until it reaches the hard threshold, Z, beyond which the application has "0" (zero) value to the users. In other words, the OPdex (T, Z, 1, 1) and the value function can be expressed as:

$$f(y) = \left(\frac{Z-y}{Z-T}\right).$$

Figure 4:
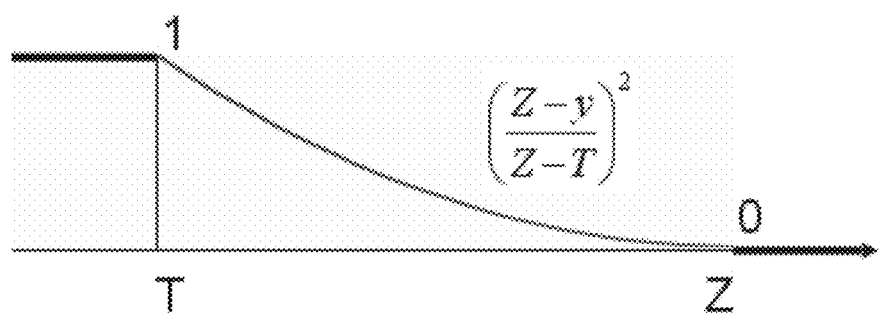
FIG. 4 shows another OPdex example where the OPdex value decreases in a quadratic fashion after the response time exceeds the soft threshold.

FIG. 4 shows another OPdex where the OPdex value decreases in a quadratic fashion after the response time exceeds the soft threshold, T, until it reaches the hard threshold, Z, beyond which the application has "0" (zero) value to the users. In other words, the OPdex (T, Z, 1, 1) and the value function can be expressed as:

$$OPdex(T, Z, 2, 1) = \frac{n_1 + \sum_{i=1}^{n_2}\left(\frac{Z-y_i}{Z-T}\right)^2}{n_1 + n_2 + n_3}.$$

Of Note, the OPdex representation with a quadratic value function $$f(y) = \left(\frac{Z-y}{Z-T}\right)^2$$

shown in FIG. 4 can also be represented as:

$$OPdex_{Model}(T, Z, 2, 1) = 1 - \frac{2\bar{r}}{Z-T}\left[\frac{\bar{r}}{Z-T}e^{-\frac{Z}{\bar{r}}} + \left(1 - \frac{\bar{r}}{Z-T}\right)e^{-\frac{T}{\bar{r}}}\right] =$$
$$1 - \frac{2\mu(1-\rho)}{Z-T}\left[\frac{\mu(1-\rho)}{Z-T}e^{-\mu(1-\rho)Z} + \left(1 - \frac{\mu(1-\rho)}{Z-T}\right)e^{-\mu(1-\rho)T}\right].$$

FIG. 6 compares the three groups of OPdex models. It shows that for the same soft threshold, T=10 in this example, as hard threshold increases, from Z=40 to 70, the OPdex value with a constant value function, $OPdex_{Model}(10,Z,0,\frac{1}{2})$, does not change significantly when the hard threshold Z is relatively large (Z≥40 in this example), while for OPdex with linear or quadratic value functions, OPdex values are influenced even when the hard threshold is large. It also shows that OPdex with a quadratic value function has smaller values than the OPdex with a linear value function for the same response time. Since users' satisfaction level for application response time varies widely, it is unlikely that one type of OPdex will fit all. With the qualitative representations introduced in this invention, users can select an OPdex with a proper value function to match their application response time expectations.

In other embodiments, the OPdex can be used to troubleshoot the sensitivity of soft thresholds and hard thresholds under different value functions. For example, FIGS. 7-12 illustrate the asymptotic behaviors of the OPdex values for different value functions as the hard threshold increases (to infinity): $OPdex_{Model}(T,Z,1,1)$ and $OPdex_{Model}(T,Z,2,1)$ approach the same limit, 1, while $PPdex_{Model}(T,Z,0,\frac{1}{2})$ approaches a constant less than 1. In other words, $$\lim_{Z\to\infty} OPdex_{Model}(T, Z, 1, 1) = OPdex_{Model}(T, \infty, 1, 1) = 1,$$

and $$\lim_{Z\to\infty} OPdex_{Model}(T, Z, 2, 1) = OPdex_{Model}(T, \infty, 2, 1) = 1,$$

while $$\lim_{Z\to\infty} OPdex_{Model}(T, Z, 0, C) = 1 - (1-C)e^{-\frac{T}{\bar{r}}}.$$

As a special case, when C=½, $$\lim_{Z\to\infty} OPdex_{Model}(T, Z, 0, C) = OPdex_{Model}\left(T, \infty, 0, \frac{1}{2}\right) = 1 - \frac{e^{-\frac{T}{\bar{r}}}}{2}.$$

Figure 7:
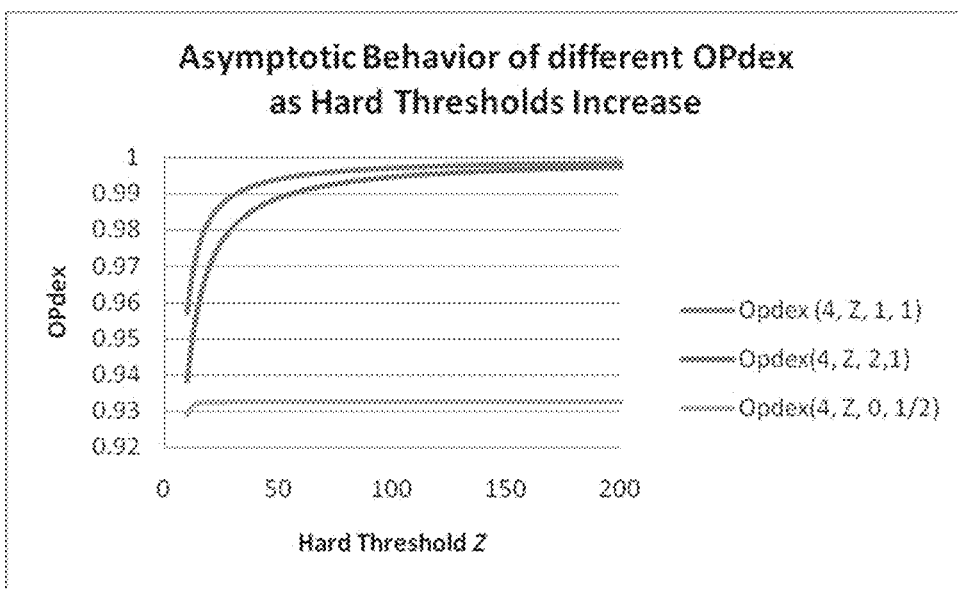
FIGS. 7-12 show the asymptotic behavior of the OPdex as function of the hard threshold, soft threshold, and application response times.

FIG. 7 shows the asymptotic behavior for three models, $OPdex_{Model}(T,Z,1,1)$, $OPdex_{Model}(T,Z,2,1)$, and $OPdex_{Model}(T,Z,0,½)$. In this display, we assume that the mean response time $\bar{r}$ is 2, the soft threshold T is 4, and the hard threshold changes from 10 to 200. As we can see, after certain point, $OPdex_{Model}(4,Z,2,1)$ and $OPdex_{Model}(4,Z,1,1)$ approach 1, and $OPdex_{Model}(4,Z,0,½)$ approaches 0.9323:

$$\lim_{Z \to \infty} OPdex_{Model}\left(T, Z, 0, \frac{1}{2}\right) = 1 - \frac{e^{-\frac{T}{\bar{r}}}}{2} = 1 - \frac{e^{-\frac{4}{2}}}{2} = 0.9323.$$

In FIG. 7, the curves show the asymptotic behavior of the OPdex as hard thresholds are increased. In particular, the curves show the effect of increasing the hard threshold while maintaining the mean response time and the soft threshold constant.

Figure 8:
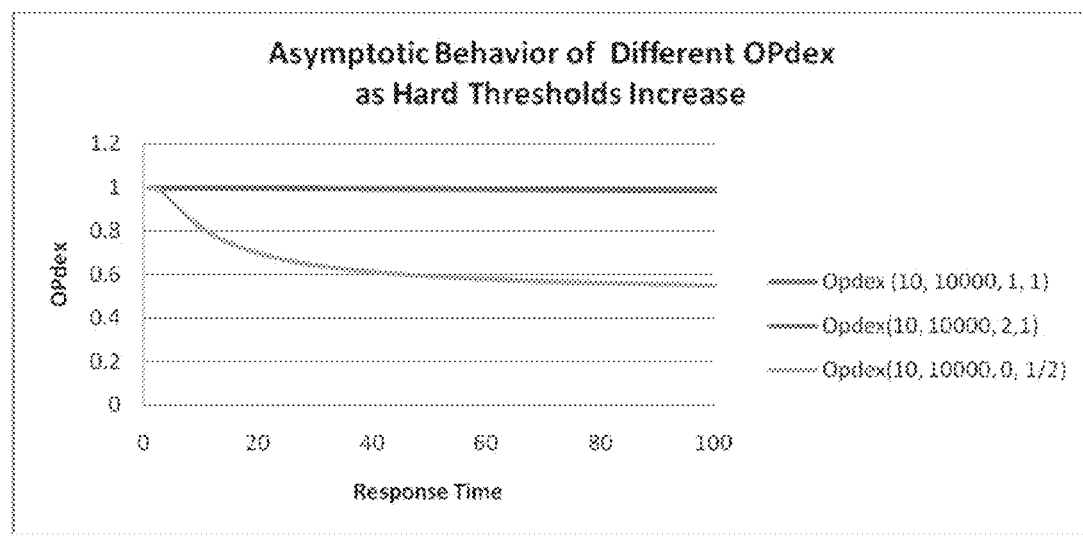

In FIG. 8, the curves show different OPdex behavior when both soft and hard thresholds are held constant while increasing the mean response time. In particular, FIG. 8 shows the OPdex values as the mean response time increases when the hard threshold is set relatively high compared to the soft threshold. FIG. 8 also shows that the OPdex with a constant value function has a different behavior than the OPdex with either a linear or quadratic value function.

As shown in FIG. 8, the OPdex values approach 1 as hard thresholds increase for an OPdex with linear and quadratic value functions, while for an OPdex with a constant value function (e.g., C=½), the OPdex value approaches a constant less than 1 when the hard threshold Z is set very high compared to the soft threshold (such as 1000:1).

Figure 9:
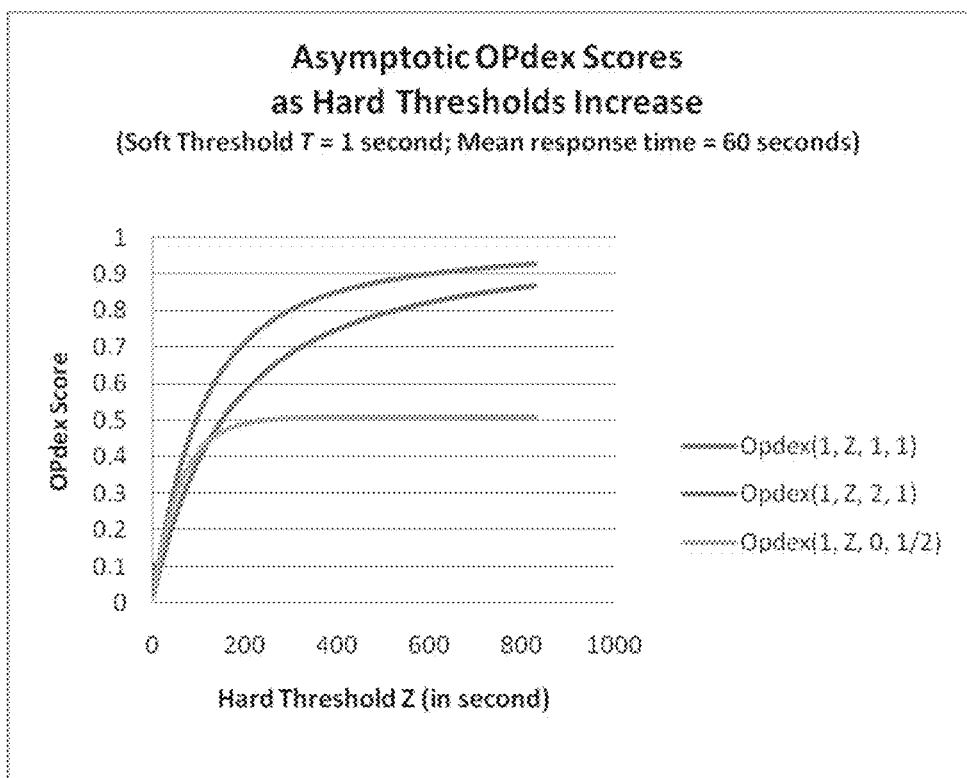

FIG. 9 shows asymptotic OPdex scores for a linear, a quadratic, and a constant value function, assuming the soft threshold T=1 second and the mean response time $\bar{r}$=60 seconds.

FIG. 10 shows a high OPdex score (close to 1) for a system with a 0.1 seconds average response time.

Figure 11:
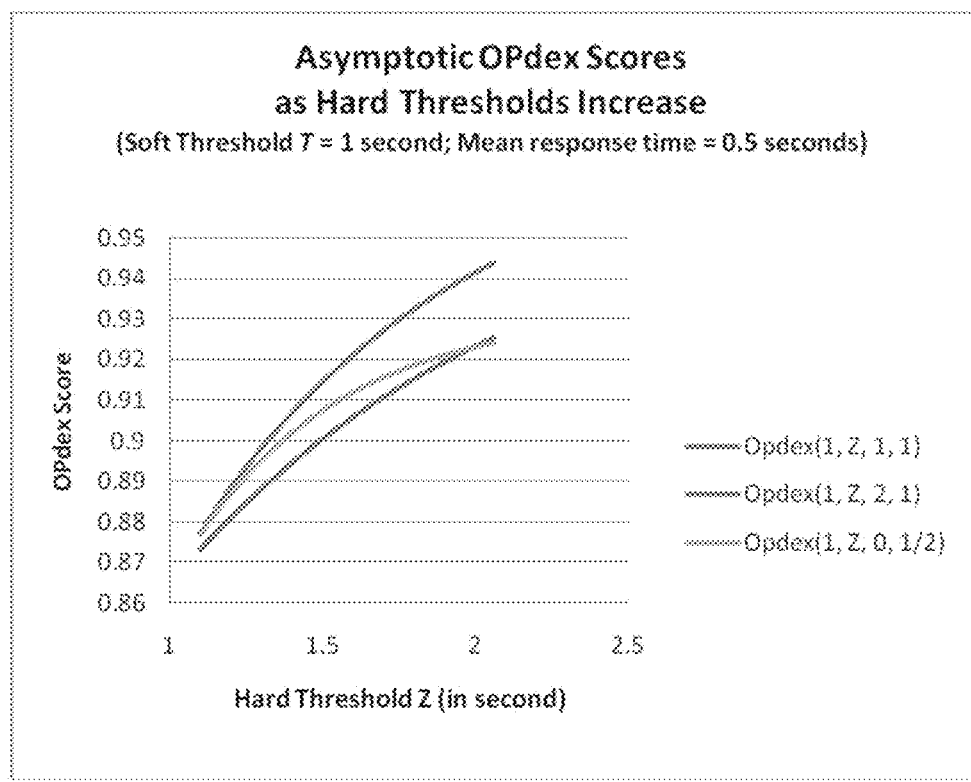

FIG. 11 shows an OPdex score over 0.9 with a hard threshold Z=2 second, for all three different value functions (linear, quadratic, or constant).

Figure 12:
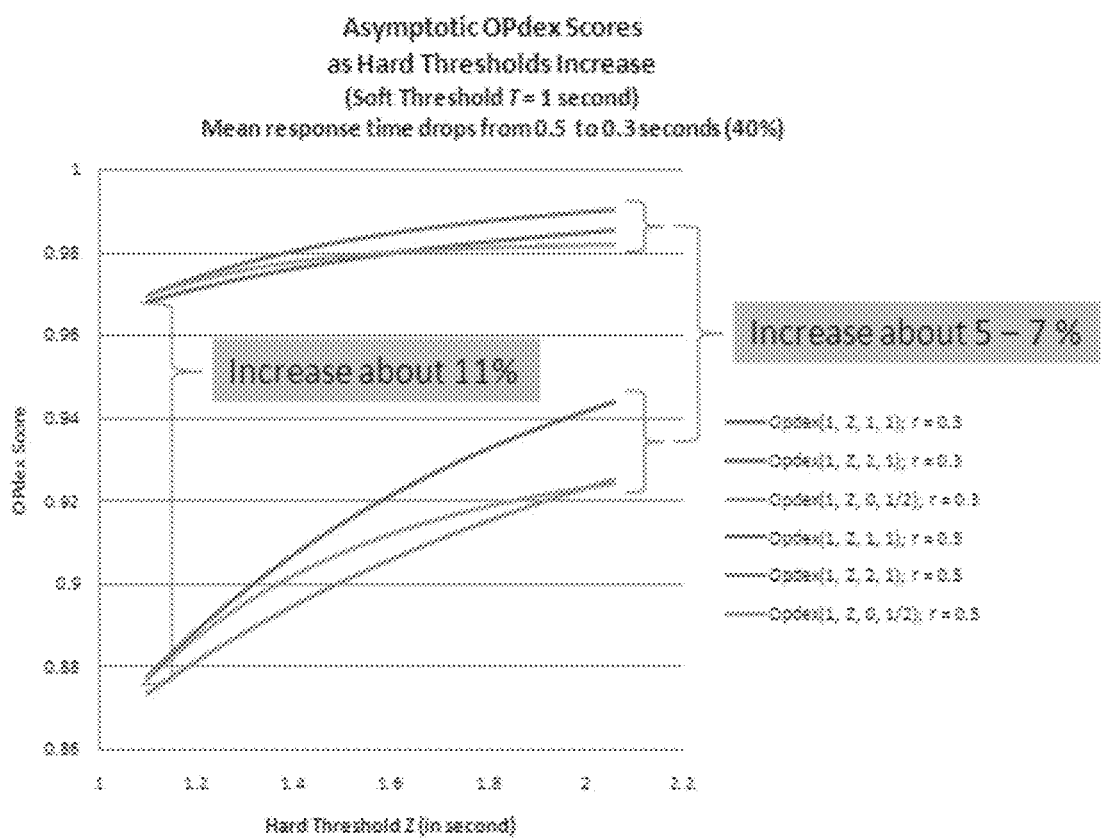

FIG. 12 shows asymptotic OPdex scores for a linear, a quadratic, and a constant value function, assuming the soft threshold T=1 second and the mean response time $\bar{r}$=0.5 seconds.

As can be seen, for a high OPdex value, i.e., the OPdex value close to 1, any further increase in the OPdex value may require a substantial reduction in the mean response time. For instance, FIG. 12 shows that while the mean response time drops 40% from 0.5 seconds to 0.3 seconds, the OPdex values increase only about 5 to 11%, depending on the value function chosen and the hard thresholds selected. The reason is that the relationship between OPdex value and application response time is not linear.

FIGS. 13-15 show exemplary embodiments of OPdex that vary on metrics other than application response time. For purposes of illustration, the OPdex values are shown having a scale from 0 to 1. However, different OPdex scales, such as 0 to 10, 0 to 100, etc., may be employed in various embodiments. The OPdex curves shown in FIGS. 13-15 are merely exemplary to illustrate the application of OPdex values to various metrics.

For example, FIG. 13 shows an exemplary embodiment for OPdex that is based on processor utilization as a metric. In this embodiment, the OPdex may range on a scale from 0 to 1 for processor utilization measured as a percentage from 0 to 100%. As shown, a computer system or application may be able to sustain a relatively high OPdex value over a broad range of processor utilization percentages. In this example, as a processor becomes fully utilized, e.g., above 75%, the processor may be unable to sustain application performance, which is reflected in the declining OPdex values. FIG. 13 is merely exemplary, and as described above, the OPdex may vary for different processors and computer systems.

FIG. 14 shows an exemplary embodiment for OPdex that is based on memory used. In this embodiment, the OPdex may again range on a scale from 0 to 1 to measure satisfaction with performance of a computer system having a memory of 4 gigabytes. In this example shown, as memory utilization increases, the OPdex value declines.

FIG. 15 shows an exemplary embodiment for OPdex that is based on disk activity. In this embodiment, the OPdex ranges on a scale from 0 to 1 as a function of disk activity by a computer system. In this example shown, the OPdex value decreases stepwise as disk activity increases.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A computer-implemented method of identifying a source of a problem in an application running on a computer system, the method comprising:
   receiving, by a server, data related to a plurality of types of metrics associated with the application;
   determining, by the server, a respective first value for each type of metric that corresponds to unsatisfactory performance;
   determining, by the server, a respective second value for each type of metric that corresponds to satisfactory performance;
   determining, by the server, a respective parameter for each type of metric that indicates a sensitivity of a respective index to a change in the corresponding type of metric between the respective first and second values; and
   calculating, by the server, the respective index for each type of metric that ranges between the respective first and second values based on the respective first value, the respective second value, and the respective parameter.

2. The method of claim 1, wherein receiving data comprises receiving network data.

3. The method of claim 1, wherein receiving data comprises receiving application performance data.

4. The method of claim 1, wherein receiving data comprises receiving application response time data.

5. The method of claim 1, wherein receiving data comprises receiving link utilization data.

6. The method of claim 1, wherein receiving data comprises receiving processor utilization data.

7. The method of claim 1, further comprising providing information identifying a set of indexes comprising the respective index for each type of metric, wherein the information ranks the set of indexes based on a severity of the corresponding type of metric.

8. The method of claim 1, further comprising providing information identifying a set of indexes comprising the respective index for each type of metric, wherein each respective index is provided with a color indicating a severity of the respective index in relation to a possible source of the problem.

9. The method of claim 1, wherein the respective index for each type of metric ranges in value from 0 to 1.

10. The method of claim 1, wherein the respective index for each type of metric comprises a different range in value based on the type of metric.

11. A computer-implemented method for calculating an index indicating performance of an application running on a computer system, wherein the index ranges between a first value corresponding to unsatisfactory performance and a second value corresponding to a completely satisfactory performance, the method comprising:
receiving, from at least one instrument coupled to the computer system, data indicating at least one metric having a range of values related to the performance of the application;
determining a first threshold for the at least one metric indicating a value of the metric beyond which the performance of the application is categorized as declining;
determining a second threshold for the at least one metric indicating a value of the metric beyond which the performance of the application is categorized as unsatisfactory;
determining a set of parameters indicating a sensitivity of the index to a change in the value of the metric between the first and second threshold; and
calculating the index indicating the performance of the application between the first threshold and second threshold based on the first threshold, the second threshold, and the set of parameters.

12. The method of claim 11, wherein the index ranges between 0 corresponding to unsatisfactory performance and 1 corresponding to completely satisfactory performance.

13. The method of claim 11, wherein determining the set of parameters indicating the sensitivity of the index comprises receiving at least one desired value for the index based on a value for the metric between the first and second thresholds.

14. The method of claim 11, wherein calculating the index is based on a quadratic function of the first and second thresholds and the set of parameters.

15. The method of claim 11, wherein calculating the index comprises calculating the index based on respective functions corresponding to different intervals of values between the first and second thresholds.

16. A method of modeling performance of an application based on an index in a computer system, wherein the index ranges between a first threshold corresponding to unsatisfactory performance and a second threshold corresponding to a completely satisfactory performance, the method comprising:
receiving, by the computer system, a set of desired values for the index between the first and second thresholds;
determining, by the computer system, a sensitivity of the index based on the received set of desired values; and
determining, by the computer system, a function for the index based on the received set of desired values, wherein the function calculates the index for response times between the first threshold and second threshold based on the sensitivity.

17. The method of claim 16, further comprising determining a response time for a desired value of the index.

18. The method of claim 16, further comprising determining a maximum response time for a desired value of the index.

19. The method of claim 16, wherein the first threshold is approximately 0 and the second threshold is approximately 1.

20. The method of claim 16, wherein determining the function comprises selecting a quadratic function.

21. A non-transitory computer-readable storage medium having control logic recorded thereon that, when executed by a processor, causes the processor to perform a method for calculating an index in a computer system, the method comprising:
receiving, from an instrument coupled to the computer system, data indicating a metric having a range of values related to a performance of an application;
determining a first threshold for the metric indicating a value of the metric beyond which the performance of the application is categorized as declining;
determining a second threshold for the metric indicating a value of the metric beyond which the performance of the application is categorized as unsatisfactory;
determining a set of parameters indicating a sensitivity of the index to a change in the value of the metric between the first and second threshold; and
calculating an index indicating the performance of the application between the first threshold and second threshold based on the first threshold, the second threshold, and the set of parameters.

22. The non-transitory computer-readable storage medium of claim 21, wherein the index ranges between 0 corresponding to unsatisfactory performance and 1 corresponding to completely satisfactory performance.

23. The non-transitory computer-readable storage medium of claim 21, wherein determining the set of parameters comprises receiving a desired value for the index based on a value for the metric between the first and second thresholds.

24. The non-transitory computer-readable storage medium of claim 21, wherein calculating the index is based on a quadratic function of the first and second thresholds and the set of parameters.

25. The non-transitory computer-readable storage medium of claim 21, wherein calculating the index comprises calculating the index based on respective functions corresponding to different intervals of values between the first and second thresholds.

* * * * *